United States Patent [19]

Goto et al.

[11] Patent Number: 4,885,599
[45] Date of Patent: Dec. 5, 1989

[54] PRE-WINDING CONTROL DEVICE FOR A CAMERA

[75] Inventors: Shigenori Goto; Fumio Iwai, both of Omiya, Japan

[73] Assignee: Fuji Photo Film Co., Ltd., Kanagawa, Japan

[21] Appl. No.: 204,867

[22] Filed: Jun. 10, 1988

[30] Foreign Application Priority Data

Jun. 10, 1987 [JP] Japan ............................. 62-144903

[51] Int. Cl.4 .................................................. G03B 1/12
[52] U.S. Cl. ............................................. 354/173.11
[58] Field of Search ........................ 354/173.1, 173.11

[56] References Cited

U.S. PATENT DOCUMENTS

| 4,443,084 | 4/1984 | Harada et al. | 354/173.11 |
| 4,477,163 | 10/1984 | Matsumoto et al. | 354/173.11 |
| 4,502,770 | 3/1985 | Nuiva et al. | 354/173.11 |
| 4,571,044 | 2/1986 | Wakalayashi | 354/173.11 |

Primary Examiner—Michael L. Gellner
Attorney, Agent, or Firm—Young & Thompson

[57] ABSTRACT

A pre-winding control device of a camera includes a sensor for detecting a predetermined length of a flimstrip, a film drive device for pre-winding the film strip before exposures and for rewinding the film strip after exposures, and a pulse generator for generating pulses, one for every advancement of a predetermined length of the film strip. The control device is characterized by a detector for detecting time intervals at which the pulses are generated, a time interval setting circuit for setting an interruption time interval based on the time intervals for which the film drive device is allowed to be left interrupted, and a disabling circuit for disabling the film drive device when the sensor detects no pulse for at least the interruption time interval. The interruption time interval is given as an average of a predetermined number of the time intervals multiplied by a coefficient between 2 and 5.

9 Claims, 3 Drawing Sheets

PRE-WINDING CONTROL DEVICE FOR A CAMERA

BACKGROUND OF THE INVENTION

The present invention relates to a pre-winding camera of the type adapted to pre-wind all frames of a filmstrip loaded therein before exposures and to rewind it one frame for every exposure and more particularly to a prewinding control device for the pre-winding camera.

It is known to provide an electrically powered film driving device for winding all frames of a filmstrip before making exposures in modern cameras, especially 35mm cameras. Such a camera, which is called a pre-winding camera, is provided with electrically powered film drive means such as an electrically powered reverse-drive motor that is interchangeably operationally coupled to a film take-up spool in a film chamber in order to withdraw a filmstrip from a patrone or cartridge and wind it up onto the take-up spool before making exposures or just after loading of the patrone and in order to rewind the exposed filmstrip onto a spool disposed in the patrone, one frame of the filmstrip for every exposure.

As is well known, the pre-winding camera is adapted to start the film drive motor in response to closing a back door of the camera for winding up all frames of the filmstrip onto the take-up spool in the film chamber. When all frames of the filmstrip are wound onto the take-up spool, the film drive motor is interrupted in rotation and terminates prewinding of the filmstrip. More specifically, there is provided in such a pre-winding camera sensing means for sensing detectable means, such as sprocket holes or perforations, formed along a filmstrip and means for generating signals, one for every predetermined number of the detectable means detected by the sensing means. For example, when a sprocket wheel engaged with the sprocket holes or perforations in the filmstrip turns one revolution for every advancement of a predetermined length of filmstrip, the pulse signal generating means provides one pulse signal. Since the trailing end of the filmstrip is secured to a spool of the patrone, when all frames of the filmstrip are wound onto the take-up spool, the filmstrip cannot be withdrawn from the patrone any more, interrupting the rotation of the film drive motor. Consequently, film advancement is terminated and the pulse signal generating means stops generating pulse signals. Therefore, when no pulse signal is provided for a predetermined period of time, it is decided that the filmstrip has been fully would up. Upon this decision, the film drive motor is stopped. This predetermined period of time (which is hereinafter referred to as an interruption time interval) is set to be relatively long so as not to determine the completion of pre-winding of the filmstrip when a time interval at which pulse signals are generated becomes longer due to a drop of battery power.

One problem in such a pre-winding camera is that the film drive motor is left interrupted in rotation for a time interval longer than the interruption time interval independently of the battery power. In order to prevent the film drive motor from generating heat by interruption in rotation and from breaking down, it is desirable to shorten the interruption time interval in the case where an electric current flowing to the film drive motor is or becomes large due to the interrupted rotation of the film drive motor such as, in particular, when the battery is fresh and, therefore, has a high power. On the other hand, if the interruption time interval is too short, it is apt to make a wrong decision when pulse signals are generated at prolonged pulse generating time intervals, in particular when the filmstrip is gradually withdrawn out of the patrone at the beginning of withdrawal due to a curled film leading end or to friction caused between the film strip and the film patrone. For better protection of the electric film drive motor when batteries for the film drive motor are still fresh, it is unfavorable to shorten the interruption time interval.

OBJECT OF THE INVENTION

It is, therefore, an object of the present invention to provide a pre-winding control device of a pre-winding camera which can prevent a film drive motor from generating heat and breaking down due to the heat when a fresh battery having a high power is used as a power source.

SUMMARY OF THE INVENTION

The above object of the present invention is accomplished by incorporating a pre-winding control device in a pre-winding camera of the type having means for sensing a predetermined length of filmstrip, electrically powered drive means for pre-winding all frames of the filmstrip in a patrone onto a film take-up spool disposed in a film take-up chamber before exposures or just after loading the patrone, and means for generating pulse signals one for every predetermined length of the filmstrip detected by the sensing means. The pre-winding control device includes means for detecting pulse generating time intervals at which the pulse signals are generated, means for setting therein an interruption time interval for which the electrically powered drive means is allowed to be left interrupted in operation and which is determined based on pulse generating time intervals, and means for disabling the electrically powered drive means when the pulse signal generating means generates no pulse signal for at least the interruption time interval.

According to a preferred embodiment of the present invention, since the interruption time interval is updated by the predetermined number of the pulse generating time intervals, the interruption time interval becomes shorter when batteries are fresh and have a high power and, on the other hand, becomes longer when the batteries lose their power. Therefore, the decision of the completion of pre-winding is made depending on changes of the pulse generating time intervals of pulse signals caused by changes of battery power due to aging.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

A pre-winding control device according to a preferred embodiment of the present invention is incorporated in a picture camera, in particular a 35mm still picture camera. Because such cameras are well known in the art, this description will be directed in particular to elements forming part of or cooperating directly with apparatus embodying the present invention. It is to be understood, however, that camera elements not specifically shown or described may take various forms known to those skilled in the camera art.

Figure 1:
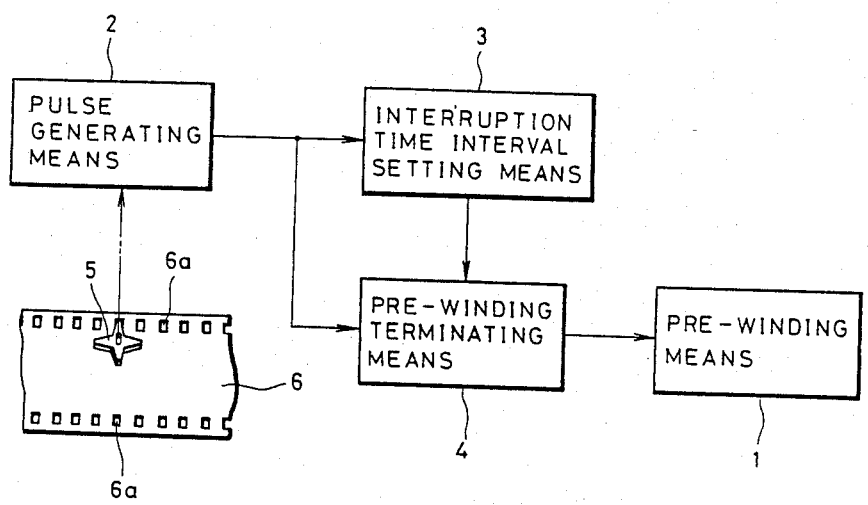
FIG. 1 is a block diagram showing a general construction of the pre-winding control device according to the present invention.

Referring now to FIG. 1 showing in a block diagram the pre-winding control device of a preferred embodiment of the present invention, the pre-winding control device comprises pre-winding means 1 for winding up a filmstrip 6 in a patrone onto a take-up spool by means of a reversible-drive electric motor when the filmstrip 6 in the patrone is loaded in a camera. The control device also includes pulse generating means 2 for generating pulse signals one for every predetermined length of the filmstrip 6, for example one for every predetermined number of perforations 6a in the filmstrip 6, interruption time interval setting means 3 for setting a time interval of interruption in rotation of a film drive motor which is updated depending on the pulse generating time intervals at which the pulse signals are generated during film pre-rewinding, and pre-winding terminating means 4 for terminating the film pre-winding operation of the prewinding means 1 when no pulse signal is detected for at least the updated interruption time interval.

The pulse signal generating means 2 is adapted to generate pulse signals, for example, in cooperation with a sprocket wheel 5 in engagement with perforations 6a or sprocket holes along the filmstrip 6 and being rotated by the filmstrip 6. It is noted that the number of pulse signals generated by the pulse signal generating means 2 is proportional to the number of perforations 6a formed for the predetermined length of the filmstrip 6. Specifically, the pulse generating means 2 may generate one pulse signal for one or N (for example four or eight) perforations 6a. It is permissible to replace the sprocket wheel 5 with a photosensor well known in the art.

Figure 2:
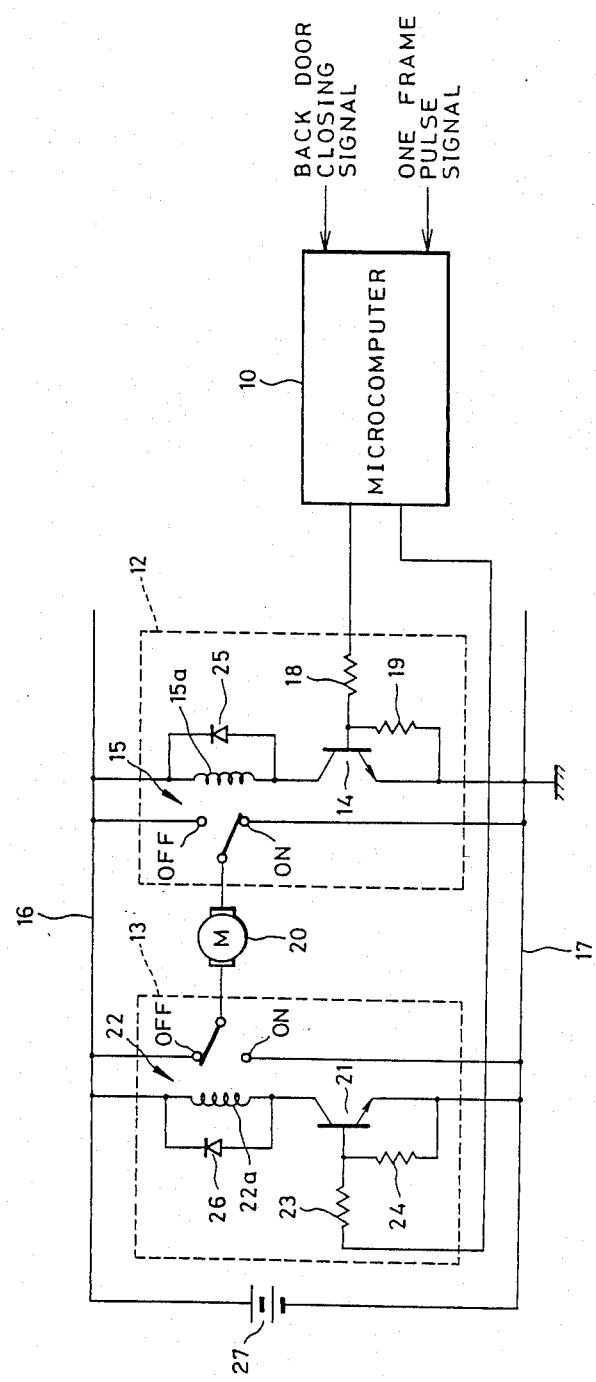
FIG. 2 is a diagram showing a film drive motor control circuit for use with the pre-winding control device of FIG. 1.

Reference is now had to FIG. 2 showing a prewinding control device embodying the present invention. As shown, a microcomputer 10 is adapted to receive a back door closing signal generated by means of an on-off switch well known in the art and provided in association with a back door of the camera and pulse signals generated by the pulse generating means 2. The microprocessor controls motor driving circuits 12 and 13 for motor reversal. The pulse generating means 2 provides a predetermined number of pulse signals for a certain number of perforations 6a which are provided for each frame of the filmstrip 6. For counting the predetermined number of perforations 6a, there is provided in association with the pulse generating means 2 the sprocket wheel 5 engaging the perforations 6a of the filmstrip 6 which makes two revolutions for every predetermined number of perforations 6a to provide signals, one for every revolution. The driving circuit 12 which controls the film drive motor 20 to rotate in one or a normal direction so as to pre-wind the filmstrip 6 in the patrone onto the take-up spool includes a switching transistor 14 and a relay 15. The collector of the transistor 14 is connected to a power line 16 through an exciting coil 15a of the relay 15, and the emitter of the transistor is connected to a ground line 17, and the transistor base is connected to the microcomputer 10 through a resistance 18 and to the emitter thereof through a resistance 19. This transistor 14 is controlled by the microcomputer 10 to be conductive or non-conductive so as to or not to excite the relay 15. The relay 15 has an OFF contact connected to the power line 16, an ON contact connected to the ground line 17 and a common contact connected to one terminal of the film drive motor 20. When the exciting coil 15a of the relay 15 is excited, the common contact is brought into contact with the ON contact. The driving circuit 13 which controls the film drive motor 20 to rotate in the opposite or reverse direction so as to rewind the filmstrip 6 into the patrone by one frame for every exposure includes a switching transistor 21 and a relay 22. The transistor 21 has a collector connected to the power line 16 through an exciting coil 22a of the relay 22, an emitter connected to the ground line 17 and a base connected to the microcomputer 10 through a resistance 23 and to the emitter thereof through a resistance 24. This transistor 21 is controlled by the microcomputer 10 to be conductive or non-conductive so as to or not to excite the relay 22. This relay 22 has an OFF contact connected to the power line 16, an ON contact connected to the ground line 17 and a common contact connected to the other terminal of the film drive motor 20. When the relay 22 is excited, the common contact is brought into contact with the ON contact. Connected in parallel with the exciting coils 15a and 22a of the relays 15 and 22, respectively, are diodes 25 and 26 provided to prevent an occurrence of inverse electromotive force. The power line 16 and the ground line 17 are connected to a battery 27.

Figure 3:
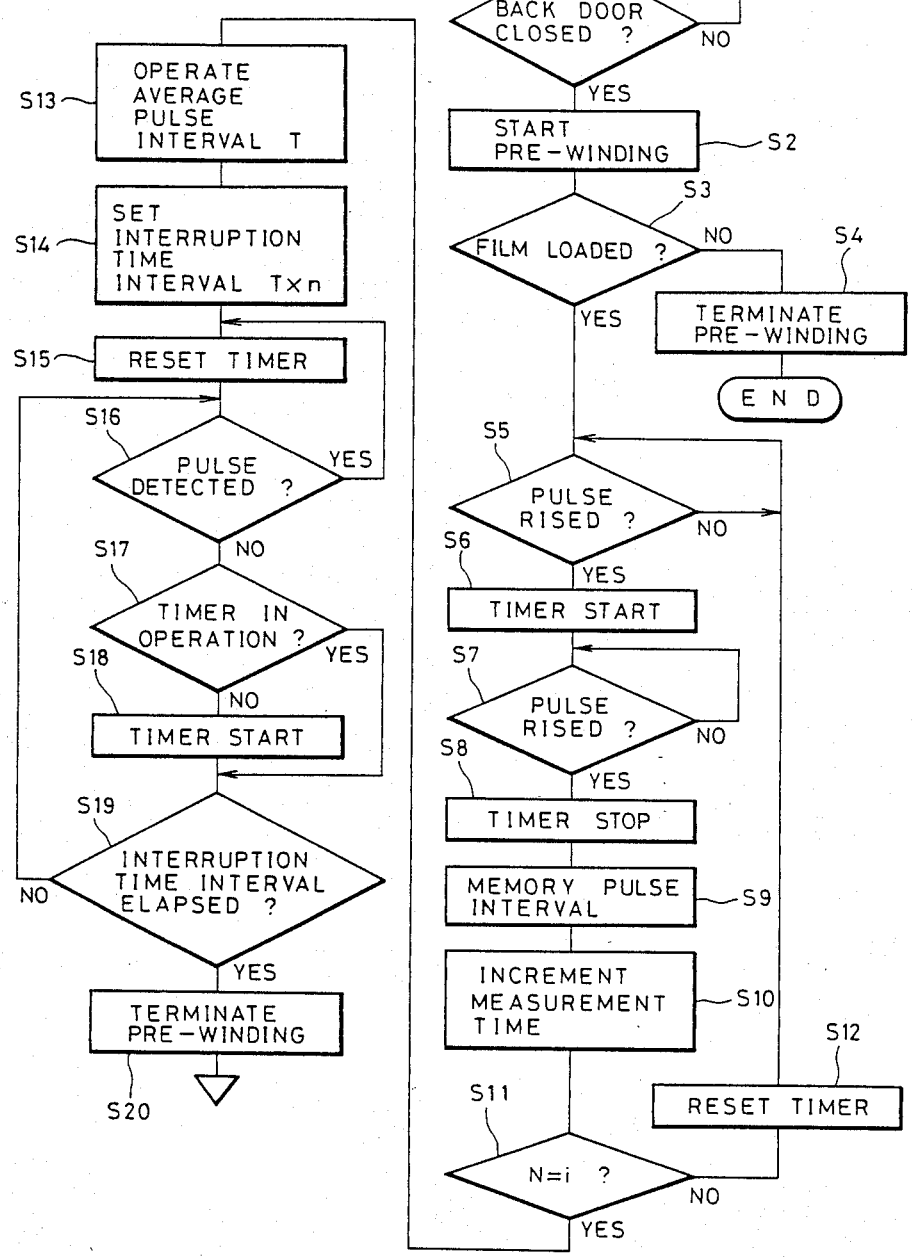
FIG. 3 is a flow chart illustrating a sequential control of operation of the pre-winding control device of FIG. 1.

The operation of the pre-winding control device depicted in FIG. 2 is best understood by reviewing FIG. 3, which is a flow chart illustrating a programmed sequence of operation for the microcomputer 10. Programming a microcomputer is a skill well understood in the art. The following description is written to enable a programmer having ordinary skill in the art to prepare an appropriate program for the microcomputer 10. The particular details of any such program would of course depend upon the architecture of the particular microcomputer selection.

When opening the back door of the camera, the microcomputer 10 is left disabled until the back door of the camera is closed. If in fact the back door of the camera is closed at a step S1, the microcomputer 10 causes the motor driving circuit 12 to rotate the film drive motor 20 in the normal direction for pre-winding at a step S2. At a step S3, a decision is made: "has a film been loaded?" The loading of film in the camera is detected by detecting a pulse signal generated by the pulse generating means 2 in a certain time period after the beginning of rotation of the film drive motor 20 or detecting the existence of a patrone in the camera. The patrone may be detected in any known manner. If no patrone is detected, the microcomputer 10 stops the film drive motor 20 at a step S4 and terminates the programmed sequence of operation thereof.

If the answer to the decision at the step S3 is yes, this indicates that a filmstrip 6 has been loaded. Then, through steps S5 to S8, the microcomputer 10 measures a pulse generating time interval between the rising phases of each adjacent two pulse signals generated by the pulse generating means 2. At a step S9, the pulse generating time interval is memorized. The number i of measurements is incremented by one for every measurement at a step S10. At a step S11, a decision is made: "is the number i of measurements equal to a number N (for example 10)?" If the answer to the decision at the step S11 is no, the steps S5 through S11 are repeated after resetting a timer at a step 12. When the measurement of pulse generating time interval is repeated N times, then an average pulse generating time interval T obtained from the N times of measurements is calculated at a step S13.

The average pulse generating time interval T is multiplied by a coefficient n to set an updated time interval of interruption in rotation of the film drive motor 20 in the interruption time interval setting means 3. The coefficient n is given as a proper number larger than 1 (one) which is selected suitably in order neither to decide the completion of film pre-winding based on a prolonged pulse generating time interval between adjacent two pulse signals caused by a high overload due to a momentary film jam nor to shorten the time interval of interruption of the film drive motor 20 when the battery is fresh and has a high power. For example, in the case of two pulse signals generated for every one frame of film advancement, the pulse generating time interval is approximately 0.25 sec. when a fresh battery is used. If the coefficient n is selected between 2 and 5, the interruption time interval is between 0.5 and 1.5 sec. This interruption time interval between 0.5 and 1.5 sec. is considerably shortened in comparison with that in a conventional pre-winding camera which is approximately 2 sec. in consideration of a lowered battery power.

After setting the interruption time interval at the step 14, a decision is made through steps S15 to S19 whether film pre-winding is completed or not. If no pulse signal is detected for at least the interruption time interval set at the step 14, the microcomputer 10 disables the driving circuit 12 to finish the film pre-winding. At the step S15, a timer in the microcomputer 10 is reset and a decision is made at the step S16: "is a pulse signal detected?" If the decision at the step 16 is yes, this indicates the filmstrip 6 is being pre-wound. Then, the timer in the microcomputer 10 is reset again at the step S15. The repetition of the steps S15 and S16 is continued as long as a pulse signal is detected. On the other hand, if no pulse signal is detected, another decision is made at the step 17: "is the timer in the microcomputer 10 in operation?" If the answer is no, the timer in the microcomputer 10 starts to count time at a step S18. On the other hand, if the answer to the other decision is yes, or after the timer in the microcomputer 10 starts, the final decision is made at a step S19: "has the interruption time interval elapsed?" If the interruption time interval has not yet elapsed, the steps S16 through S18 are repeated. On the other hand, as soon as the interruption time interval elapses, the controller 10 stops the film drive motor to finish the film pre-winding.

Although the above description has been directed to cameras for use with a filmstrip with a plurality of perforations for each frame, the film pre-winding control device can be embodied in cameras for use with a filmstrip with a single perforation for each frame. It is permissible to use a roller in contact with and rotated by the filmstrip to cause the pulse signal generating means to produce pulse signals.

What is claimed is:

1. A pre-winding control device used in a photographic camera of the type having means for sensing film advancement of a predetermined length of a filmstrip, drive means for pre-winding all available frames of the filmstrip onto a film take-up spool before making exposures and rewinding it one frame for every exposure, and means for generating pulse signals, one for every predetermined length of advancement of the filmstrip detected, said pre-winding control device comprising:
   means for detecting pulse generating time intervals at which said pulse signals are generated;
   means for setting and updating an interruption time interval for which said drive means is interrupted for each filmstrip winding operation, said interruption time interval being a function of a predetermined number of said pulse generating time intervals detected by said detecting means; and
   means for disabling said drive means when said pulse signal generating means generates no pulse signals for said interruption time interval.

2. A pre-winding control device as defined in claim 1, wherein said pulse signal generating means detects perforations formed in the filmstrip to provide said pulse signals.

3. A pre-winding control device as defined in claim 2, wherein said pulse signal generating means generates one pulse signal for every predetermined number of perforations.

4. A pre-winding control device as defined in claim 1 wherein said interruption time interval is the product of an average of a predetermined number of said pulse generating time intervals and a predetermined coefficient.

5. A pre-winding control device as defined in claim 4, wherein said coefficient is between 2 and 5.

6. A pre-winding control device as defined in claim 4, wherein said predetermined number is 10.

7. A pre-winding control device as defined in claim 4, wherein said drive means comprises a reverse-drive electric motor.

8. A pre-winding control device as defined in claim 5, wherein said drive means is operated to pre-wind said filmstrip upon closing a back door of said camera.

9. A pre-winding control device as defined in claim 1, wherein said interruption time interval is a function of the average of said predetermined number of said pulse generating time intervals.

* * * * *